US008332141B2

(12) United States Patent
Couckuyt

(10) Patent No.: US 8,332,141 B2
(45) Date of Patent: Dec. 11, 2012

(54) ROUTE MODIFICATIONS

(75) Inventor: Jeffrey Darren Couckuyt, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 1024 days.

(21) Appl. No.: 11/763,791

(22) Filed: Jun. 15, 2007

(65) Prior Publication Data
US 2008/0312766 A1 Dec. 18, 2008

(51) Int. Cl.
*G01C 21/32* (2006.01)
(52) U.S. Cl. ......... 701/430; 701/411; 701/424; 701/425
(58) Field of Classification Search .............. 701/200, 701/201, 400, 408, 409, 410, 411, 414, 415, 701/416, 418, 420, 422, 423, 424, 425, 428, 701/430
See application file for complete search history.

(56) References Cited

U.S. PATENT DOCUMENTS

| | | | |
|---|---|---|---|
| 5,442,349 A | 8/1995 | Inoue | |
| 5,521,826 A * | 5/1996 | Matsumoto | 701/423 |
| 5,610,821 A | 3/1997 | Gazis | |
| 5,774,073 A | 6/1998 | Maekawa | |
| 5,991,689 A | 11/1999 | Aito | |
| 6,038,509 A | 3/2000 | Poppen | |
| 6,236,933 B1 * | 5/2001 | Lang | 701/117 |
| 6,263,278 B1 * | 7/2001 | Nikiel et al. | 701/533 |
| 6,317,684 B1 * | 11/2001 | Roeseler et al. | 701/428 |
| 6,650,995 B2 | 11/2003 | Bullock | |
| 6,882,930 B2 | 4/2005 | Trayford | |
| 6,978,208 B2 | 12/2005 | Endo | |
| 7,103,474 B1 | 9/2006 | Asahara | |
| 7,216,034 B2 | 5/2007 | Vitikainen et al. | |
| 2004/0204846 A1 * | 10/2004 | Yano et al. | 701/210 |
| 2006/0015249 A1 * | 1/2006 | Gieseke | 701/210 |

(Continued)

FOREIGN PATENT DOCUMENTS

JP     11464030     3/1999

(Continued)

OTHER PUBLICATIONS

John Fawcett et al., "Adaptive Routing for Road Traffic," IEEE Computer Graphics and Applications, May/Jun. 2000, pp. 2-9, University of Cambridge, UK.

Seth Rogers et al., "An Adaptive Interactive Agent for Route Advice," Daimler/Chrysler Research and Technology Center, Palo Alto, CA., ACM 1999, pp. 198-205, Seattle, WA, USA.

(Continued)

*Primary Examiner* — Khoi Tran
*Assistant Examiner* — Stephen Holwerda
(74) *Attorney, Agent, or Firm* — Shook, Hardy & Bacon L.L.P.

(57) ABSTRACT

A computer system and media for delivering routing information are provided. The computer system includes a routing engine, a database, and routing network that are employed to respond to routing requests and user modifications of routing information received in response to the routing requests. The routing engine receives the routing requests and generates routing information that illustrates a route and metadata for directions that guides a user when navigating the route. A user that is dissatisfied with the routing information may use route modification tools to alter the route in a manner that is consistent with the user's understanding of alternate routes that may supplement the routing information provided by the routing engine. The computer system receives the user modifications, stores the user modifications, and updates the routing network to learn the alternate route provided in the user modifications.

15 Claims, 8 Drawing Sheets

U.S. PATENT DOCUMENTS

| | | | |
|---|---|---|---|
| 2006/0036363 A1* | 2/2006 | Crook | 701/202 |
| 2006/0064241 A1 | 3/2006 | Rasmussen | |
| 2006/0069501 A1* | 3/2006 | Jung et al. | 701/209 |
| 2007/0088897 A1* | 4/2007 | Wailes et al. | 711/3 |

FOREIGN PATENT DOCUMENTS

| | | |
|---|---|---|
| JP | 2001133281 | 5/2001 |
| JP | 2006021604 | 1/2006 |
| KR | 1020014026054 | 4/2001 |

OTHER PUBLICATIONS

Seth Rogers et al., "Personalization of the Automotive Information Environment," 6 pages, Daimler-Benz Research and Technology Center, Palo Alto, CA., and Computational Learning Laboratory, CSLI, Ventura Hall, Stanford University, Stanford, CA.

PCT Search Report in PCT Application PCT/US2008/065438 mailed May 25, 2011.

* cited by examiner

ROUTE MODIFICATIONS

BACKGROUND

Conventionally, routing systems receive requests for directions from a start location to an end location. The conventional routing systems utilize graphs to provide directions for a route that traverses the start location and the end location included in the requests. To generate the route, the conventional routing systems perform graph-optimizations based on metrics, such as, distance or time. In some instances, the route generated by the conventional routing systems fail to conform to a suggested route offered by an experienced navigator familiar with the current locale associated with the start location and end location.

Based on local knowledge, prior experiences, or other reasons, i.e., a particular intersection is always hard to negotiate at a certain time of day, the experienced navigator may not agree with solutions that include routes provided by the conventional routing system. To correct the solutions, the experienced navigator may ignore the routes provided by the conventional routing system, or the conventional routing system may be hardwired to consider the suggested route provided by the experienced navigator. The experienced navigator hardwires the conventional routing system by inserting waypoints that alter the conventional routing system's processing when navigating between the start and end location.

Generally, conventional routing systems do not incorporate the waypoints into future routing decisions. Moreover, the conventional routing systems do not seamlessly incorporate the waypoints into the instructions associated with routes that navigate between the start and the end locations. Rather, the instructions associated with the routes will include a number of stops that match the number of waypoints, which typically represent stops or points of interest, hardwired by the experienced navigator. Thus, conventional routing systems do not provide an adequate solution that seamlessly incorporates knowledge provided by experienced navigators.

SUMMARY

A computer system includes a routing engine that generates routing information in response to requests for directions. The routing engine receives the requests for directions and user modifications to the routing information from a client device. The client device is configured with route modification tools that generate the user modifications to the routing information. To generate the user modifications, a user of the client device may draw modifications on graphical representations of the routing information via the route modification tools. In turn, the client device transmits the user modifications to the routing engine. The routing engine stores the user modifications in a route database and utilizes the user modifications to generate updated routing information. The updated routing information is transmitted to the client device for presentation to the user of the client device. Moreover, the routing engine may utilize the stored user modifications to respond to subsequent requests for similar directions received from one or more client devices that include, but are not limited to, the client device that generated the user modifications.

This Summary is provided to introduce a selection of concepts in a simplified form. The selection of concepts are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
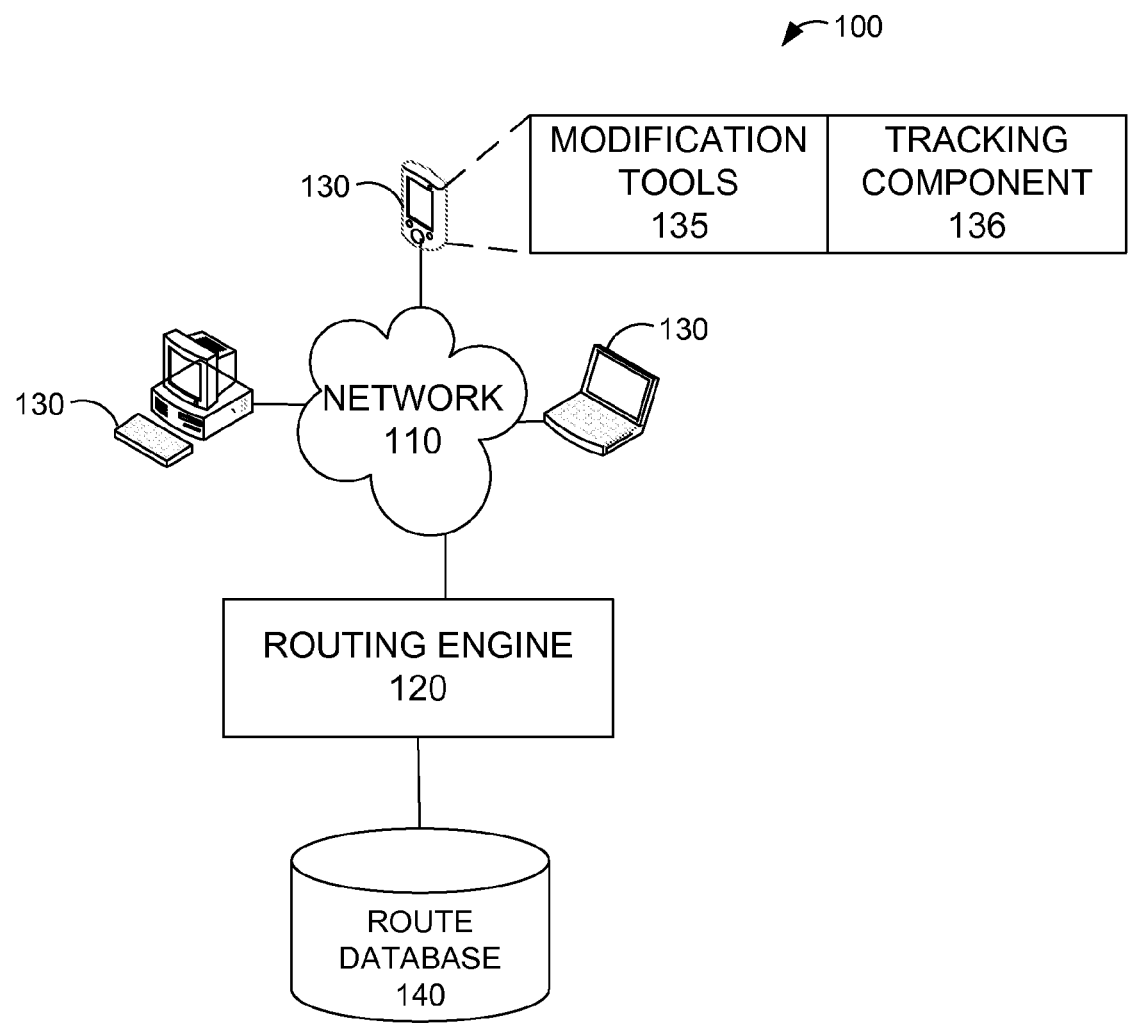
FIG. 1 is a network diagram that illustrates an exemplary operating environment.

This patent describes the subject matter for patenting with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described. Further, embodiments are described in detail below with reference to the attached drawing figures, which are incorporated in their entirety by reference herein.

As utilized herein, the term "polyline" refers to a geometrical object created by a route modification tool, where the geometrical object comprises one or more lines that pass through at least two points and provide the shortest distance between the two points. Additionally, as utilized herein, the term "component" refers to any combinations of hardware, software, or firmware.

A client device that modifies routing information is configured with route modification tools that generate user modifications to routes corresponding to routing information received in response to a request for directions from a start location to an end location. A user of the client device may utilize the route modification tools to generate customized directions by modifying one or more routes corresponding to the routing information. The client device is configured to generate both explicit and implicit modifications to the routing information. The user of the client device may utilize the route modification tools to modify a subset of a route and to generate explicit user modifications to the route included in the routing information. Alternatively, the user modifications may be inferred by tracking the user's navigation of the route to determine a frequency and magnitude of deviation from the route. When the frequency and magnitude of the deviation are above specified thresholds, the client device generates an implicit user modification to the route included in the routing information. In turn, a routing engine that provides the routing information may integrate the explicit or implicit user modifications into updated routing information that combines the route and the explicit or implicit user modifications.

The routing engine may utilize the explicit and implicit user modifications to influence routing information provided in response to future routing requests received by the routing engine. The routing engine is configured with a database that stores the implicit and explicit user modifications. Thus, when other users generate requests for the same route that is associated with implicit and explicit user modifications provided by a prior user, the routing engine may offer the other users the customized directions, i.e., user-modified routing information, in addition to, or instead of, system-generated routing information.

In one embodiment, a computer system for managing routing information includes one or more client devices communicatively connected to a routing engine. The client devices generate routing requests and transmit the routing requests to the routing engine. The routing engine generates routing information in response to the routing requests. The routing information may include system-generated routing information, which includes routing information that is generated without applying user-modifications; or user-modified routing information, which includes routing information that is generated by applying the user modifications.

FIG. 1 is a network diagram that illustrates an exemplary operating environment 100. The operating environment 100 includes a network 110, a routing engine 120, client devices 130, and route database 140.

The network 110 is configured to facilitate communication between the client devices 130 and the routing engine 120. The network 110 may be a communication network, such as a wireless network, local area network, wired network, or the Internet. In an embodiment, the client devices 130 communicate routing requests to the routing engine 120 utilizing the network 110. In response, the routing engine 120 may communicate routing information that includes system-generated routing information and user-modified routing information.

The routing engine 120 is a computing device that provides routing information. In some embodiments, the routing engine 120 is configured to execute on a server. The routing engine 120 receives routing requests from the client devices 130. The routing requests are processed by the routing engine 120 and utilized to perform graph optimizations and to search the route database 140 to locate routes that satisfy conditions included in the routing requests. The routing engine 120 transmits routing information that include the routes that satisfy the conditions to the client devices 130. In certain embodiments, the client devices 130 may transmit user modifications that modify the routing information received from the routing engine 120. The routing engine 120 receives the user modifications and integrates the user modifications when performing the graph optimizations. The user modifications are processed by the routing engine 120 to identify points where the route modification included in the user modifications intersect with the system-generated route provided in response to routing request. In an embodiment, the routing engine 120 executes a conflation algorithm to determine whether the route modifications match points associated with the underlying road network utilized by the routing engine 120 when generating the routing information. The routing engine 120 parses user modifications to identify polylines and performs a match based on a sampling of latitude and longitudes associated with the road network and the identified polylines. Based on the matches, the routing engine 120 is configured to locate incomplete user-modifications, where the user did not provide route modifications that completely connect with the system-generated route. When an incomplete route is located, i.e., no match, the routing engine 120 attempts to complete the route modifications with the closest connection that is possible. In an embodiment, when the routing engine 120 determines that more than one connection can complete each incomplete route modification, notifications are generated and sent to the client device 130. The notifications may request the client device 130 to provide information that clarifies why the route modification seems incomplete. For instance, an incomplete route modification may include modifications that navigate to ferries that transport the user over bodies of water, through areas where there are no stored road connections, or through new developments that include new roads not included in the route database 140. In response to the notification, a user of the client device 130 may provide the routing engine 120 with additional information about the route modification, such as, a period of validity for the route modifications and a description that enables other users to interpret route modifications that the routing engine 130 identifies as incomplete. In alternate embodiments, the routing engine 120 may automatically complete route modifications when a degree of error associated with the route modifications is small and only one connection is available to complete the route modification, i.e., connect the user modification with the system-generated route.

Thus, the routing engine 120 generates updated routing information that includes a route between connections identified by the routing engine. The routing engine 120 utilizes the user modifications to update the system-generated routes by removing portions of the route that are no longer needed and linking the system-generated routes with route modifications received from the user of the client device 130. The routing engine 120 provides updated routing information that traces an updated route from the start location to the end location and provides updated instructions to navigate the updated route. In some embodiments, the updated routing information is generated by enabling the routing engine 120 to incorporate user feedback into routing graphs.

The client devices 130 may be utilized by a user to provide routing requests and user modifications. Each client device 130 may include, without limitation, personal digital assistants, smart phones, laptops, personal computers, or any other suitable client computing device. The routing requests generated by the client device 130 may include start locations and end locations that a user desires to navigate. Also, the client devices 130 are configured with modification tools 135 and a tracking component 136 to generate explicit and implicit route modifications.

The modification tools 135 allow the user to generate explicit modifications by interacting with a graphical representation of the routing information. The user interaction may include drawing route modifications on the graphical representation of the system-generated routing information. A polyline may be utilized to represent the explicit route modification generated by the modification tools 135.

The tracking component 136 allows the user to generate implicit modifications to the system-generated routing information. In some embodiments, the tracking component is a Global Positioning System (GPS) that determines when the client device 130 is deviating from the system-generated routing information. The tracking system 136 observes the client device 130 to identify: when the client device 130 deviates from the route and when the client device 130 rejoins the system-generated route. The tracking component 136 tracks a frequency of the deviation and a magnitude of the deviation. Deviations where the magnitude is above a specified magnitude threshold, and where the frequency is above a frequency threshold are identified as repeat deviations that are implicit user modifications to the system-generated routing information. The implicit user modifications are transmitted to the routing engine 130 to obtain updated routing information that incorporates the implicit user modifications. For instance, a client device 130 may receive a route from a home location to a work location. The tracking component 136 of the client device 130 may track the client device 130 when navigating the route to identify deviations that are frequent and large. The identified deviations are incorporated into future responses to requests for routing information from the home location to the work location or other requests for routing information that incorporate the roads along the home to work route that are associated with the identified deviations. The responses to the other requests may include the identified deviations when the routing information for the other requests traverse one or more roads associated with previous deviations. The frequency and magnitude thresholds are specified to prevent the tracking component 135 from identifying trivial stops, i.e. stopping for coffee, as implicit user modifications. The tracking component 135 transmits the implicit user modification to the routing engine 120. The routing engine 120 updates the routing information based on the implicit user modifications received from the client device 130. The routing engine 120 may dynamically override the system-generated routing information based on the updated routing information.

In certain embodiments, the routing engine 120 is configured to count a number of client devices 130 that transmit similar implicit or explicit user modifications of the same route included in the routing information sent to the client devices 130. When the count associated with the same route is above a specified threshold, the routing engine 120 flags the implicit or explicit user modifications sent to the routing engine 120 as a shareable modification. Thus, when the routing engine 120 receives a routing request for a route that is flagged as shareable, the routing engine 120 responds with routing information that includes the user-modified routing information and the system-generated routing information.

The route database 140 is configured to communicate with the routing engine 120. The route database 140 includes data about the roads, the routing information, and the user modifications. The data may include road names, longitude and latitude, elevations, speed limits, ranks associated with each road, user modifications, a count associated with each user modification, previously generated routing information, etc. The route database 140 associates the routing requests with the implicit and explicit modifications to the routing information received and client identifiers associated with the client devices 130. The route database 140 includes information about each intersection where two or more roads connect.

In some embodiments, the rank associated with each road may indicate whether a road is a preferred route or a route to avoid. When the rank associated with the road is low, the road is a route that should be avoided. Alternatively, when rank is high the road is a preferred route.

The route database 140 is updated periodically to include new roads or changes to existing roads. In some embodiments, the route database includes a version identifier that tracks a version of the underlying information that is used to generate the routing information. The route database 140 utilizes the version identifier to track the current road data stored in the route database 140. Also, the stored user modifications to the routing information may be associated with the version identifiers to enable the routing engine 120 to provide the client devices 130 associated with implicit and explicit user modification with updated routing information that is based on the appropriate version of data included in the route database 140.

When the route database 140 receives an explicit or implicit user modification of a route, the route database is searched to locate previous requests for similar routes. When a previous request is located, the route database 140 is checked to determine if a similar implicit or explicit user modification is stored in the database. When a matching user modification is stored in the route database 140, a count associated with the user modification is incremented. When a matching user modification is not stored in the route database 140, the implicit or explicit user modification is stored in the route database 140 and associated with the route.

In some embodiments, the user modification is not stored in the route database 140. Rather, the user modification is automatically pushed to client devices 130 that generated requests for a similar route that is associated with the modification. When the route database 140 locates the matching route, a client identifier associated with the routing request is extracted, and the routing engine 120 pushes the user modifications to the client device 130 associated with the client identifier.

One of ordinary skill in the art understands and appreciates operating environment 100 has been simplified for description purposes and alternate operating environments are within the scope and spirit of the above description.

In certain embodiments, the client device generates a web page to receive the routing request. The web page includes a start and an end field. A user may enter the start location and the end location to specify routing requests for routing information that the user desires. The user may submit the routing request to the routing engine via a get route button.

Figure 2:
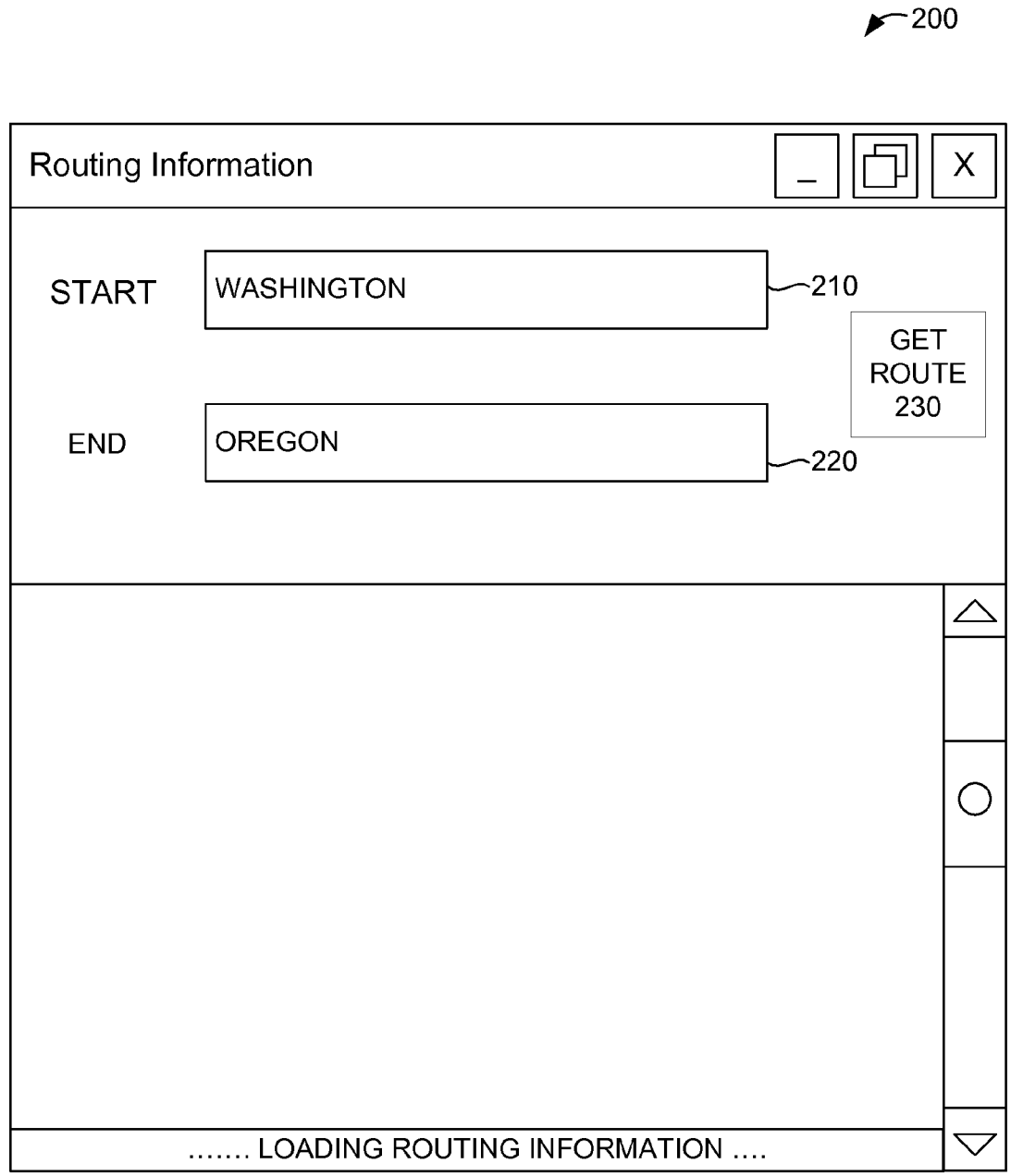
FIG. 2 is a screen shot that illustrates an exemplary web page that provides a graphical user interface for generating routing requests.

FIG. 2 is a screen shot that illustrates an exemplary web page 200 that provides a graphical user interface for generating routing requests. The web page 200 includes a start field 210, an end field 220, and a get route button 230. The user may populate the start field 210 and the end field 220 with a start location, i.e., "WASHINGTON," and an end location, i.e., "OREGON," respectively. The start location and end location may also identify a specific address or landmark. The get route button 230 is depressed by the user to submit the routing request having the start and end location to the routing engine.

The routing engine generates routing information in response to the routing request received from the client device. In certain embodiments, the routing information includes system-generated routing information. The system-generated routing information is produced by the routing engine without applying user modifications. The system-generated routing information is created by utilizing a graph of the road networks to select routes that traverse the start and end locations included in the routing requests.

Figure 3:
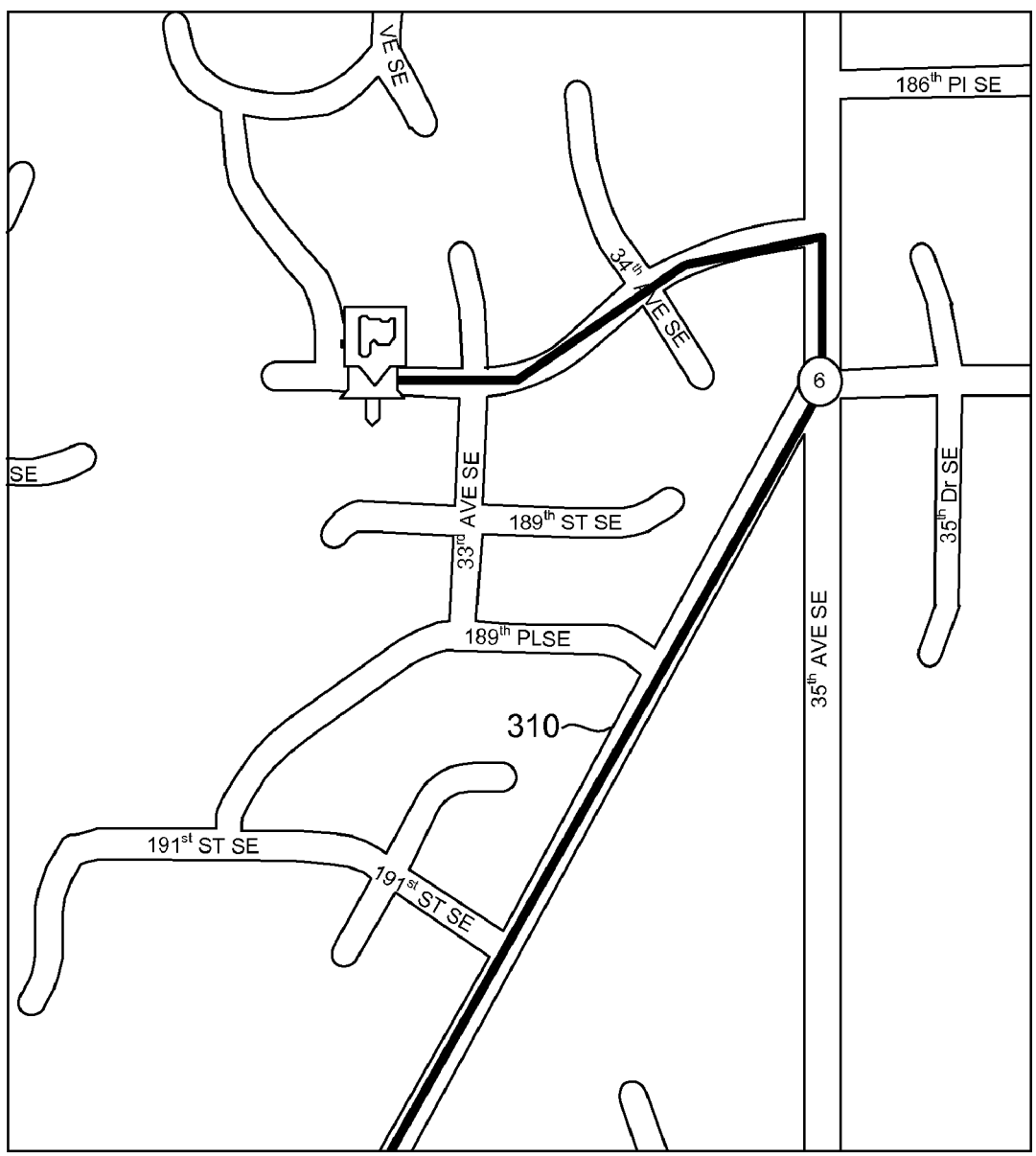
FIG. 3 is a screen shot that illustrates an exemplary route generated by the routing engine.

FIG. 3 is a screen shot that illustrates an exemplary route 310 generated by the routing engine. The routing engine may provide routing information that includes the exemplary route 310 and metadata, which may include textual directions to navigate the route 310, to the client device. The client device is configured to display the exemplary route 310 and the associated metadata. For instance, the textual directions may specify a turn signal and the name of the road that the user should turn on, i.e., turn left (north) onto $35^{th}$ Ave.

A user operating the client device generates explicit route modifications or implicit route modification to the routing information received in response to the routing request. In one embodiment, the client device presents a graphical representation of routing information to the user. In turn, the user employs modification tools to produce explicit modifications, or a tracking component to produce implicit modifications.

Figure 4:
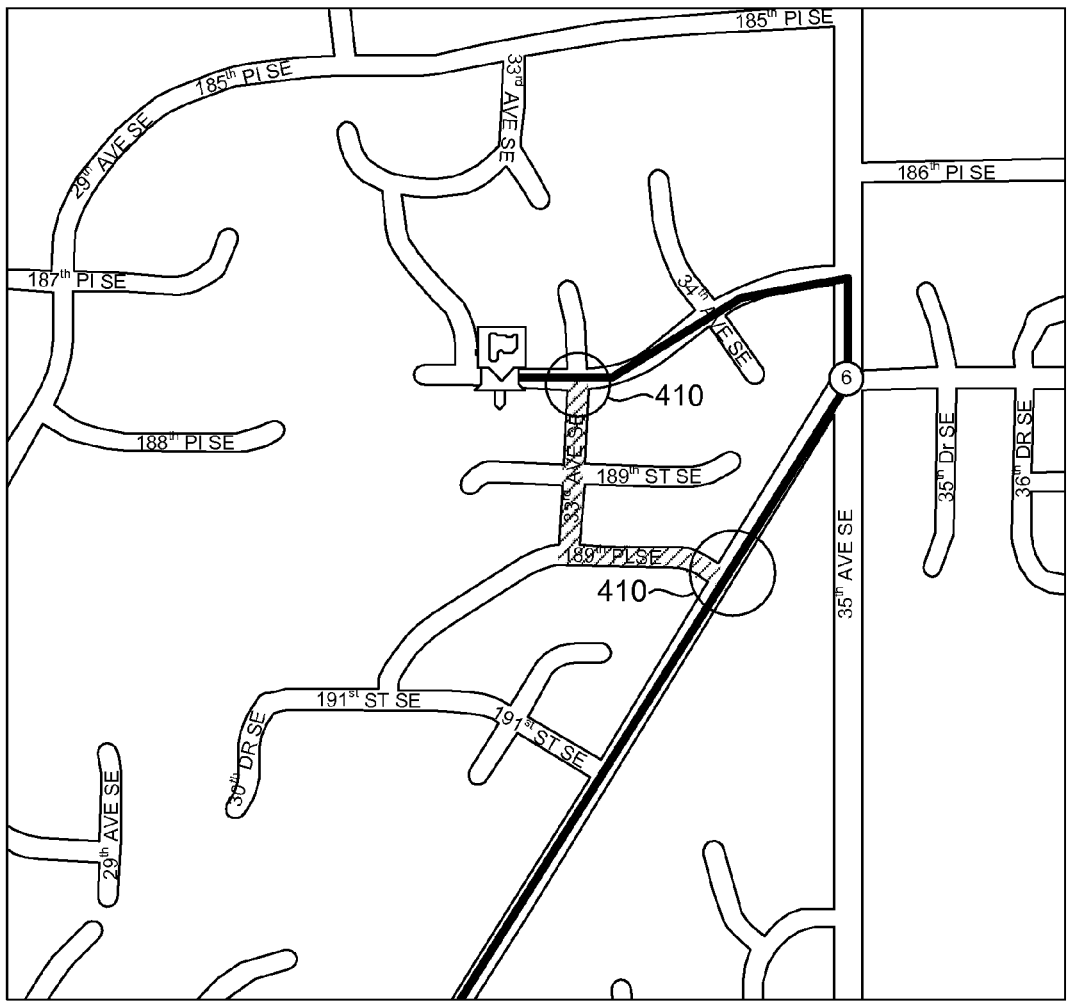
FIG. 4 is a screen shot that illustrates an exemplary route modification to the route of FIG. 3.

FIG. 4 is a screen shot that illustrates an exemplary route modification 410 to the route 310 of FIG. 3. The user of the client device may utilize the route modification tools to draw the route modification 410 one the route 310 included in the routing information. For instance, the route modification 410 provided by the user may specify an alternate route that avoids a busy intersection that is included in the system-generated route 310. After the user provides the route modification 410, the client device transmits the user modifications to the routing engine.

The routing engine receives the user modification and attempts to generate updated routing information that includes user-modified routing information. The routing engine receives the user modification and extracts points where the user modifications connects with the system-generated routing information. The routing engine updates a routing network associated with the roads represented by the connections. Ranks associated with links that represent the connections extracted from the user modification are updated, and the updated routing network is processed by the routing engine to generate updated routing information for the route modified by the user.

Figure 5:
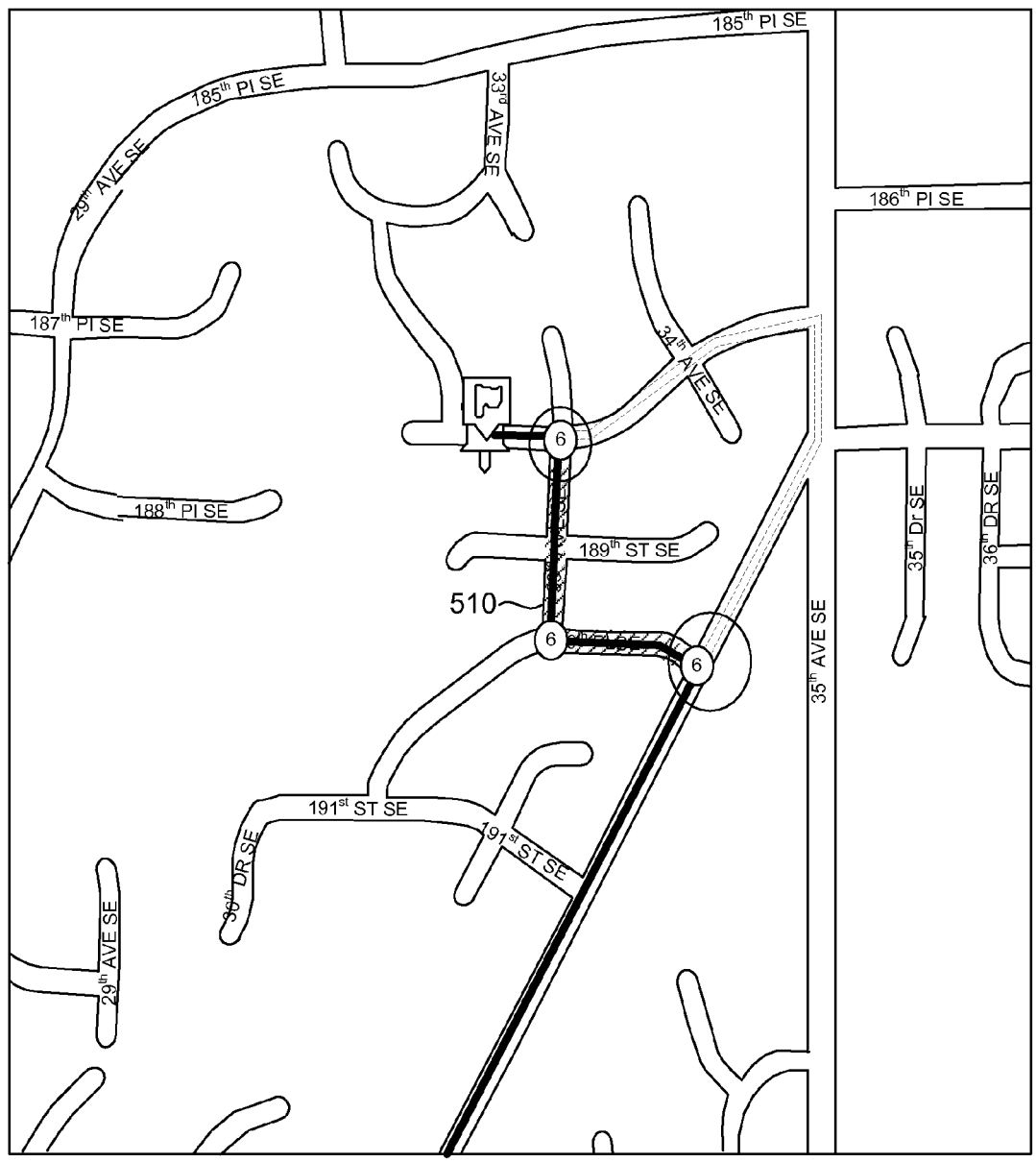
FIG. 5 is a screen shot that illustrates an exemplary updated route generated by the routing engine.

FIG. 5 is a screen shot that illustrates an exemplary updated route 510 generated by the routing engine. The updated route 510 includes the route provided in the user modifications. The routing engine may increase the rank associated with links of the routing network that represent the connections included in the user modifications. The connections may include intersections where the user modification rejoins the system-generated route. In some embodiments, the rank for connections that represent intermediate intersections that are traversed when moving between connections, where the user-modifications rejoins the system-generated route, are also increased. Thus, the updated routing network is processed by the routing engine to produce the updated routing information, which includes an updated route and updated metadata, i.e., textual instructions, estimated time of arrival, and traffic conditions, for the route.

In some embodiments, the system-generated routing information and user-modified routing information are stored in the route database. The route database is configured to store the system-generated routing information and user-modified routing information in various storage formats. Based on the size constraints associated with the routing database the routing information, i.e., system-generated routing information and user-modified routing information, may be stored in a simple format or complex format. The simple format is utilized when the route database is stored on devices that have limited storage capacities. The complex format is utilized when the route database is stored on devices that have larger storage capacities.

Figure 6A:
FIG. 6A is block diagram that illustrates exemplary storage formats for storing the routing information in a route database.
Figure 6A:
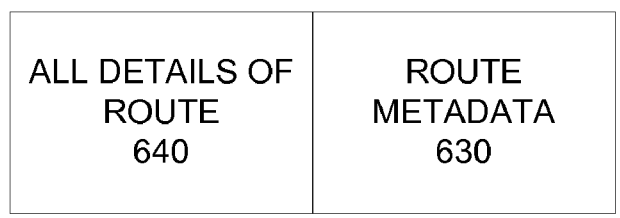

FIG. 6A is block diagram that illustrates exemplary storage formats for storing the routing information in a route database. In some embodiments, the route database may be configured with storage formats that store combinations of the start location and end location 610, user modifications 620, route metadata 630, or all details of the route 640.

Generally, the simple format is the smallest format. In the simple format, the route is always recalculated by the routing engine. In the simple format, the route database stores the start location and end location 610. The start and end locations may be stored as longitude and latitude coordinates. To produce routing information, the routing engine utilizes the stored start location and end location 610 to create a system-generated route and metadata associated with the system generated route. In an alternate embodiment, the simple format configures the route database to store the start location and end location 610 and the route metadata 630. Here, the routing engine must recalculate only the system-generated route. The metadata for the system-generated route does not have to be produced by the routing engine because it is stored in the route metadata 630.

Generally, the complex format is larger than the simple format. In the complex format, the route does not have to be recalculated by the routing engine. In the complex format, the route database is configured to store all details of the route 640. All details of the route 640 includes all polylines from the start location to the end location that comprise the route. The route database stores the exact original route, which may be transmitted to the client device without further processing at the routing engine. The only processing the routing engine would have to perform is creation of the metadata for the route stored in all details of the route 640. In an alternate embodiment, in the complex format, the route database is configured to store all details of the route 640 and the route metadata 630. When the route database stores both all details of the route 640 and the route metadata 630, the routing engine would not need to perform further processing to produce the route or the metadata associated with the route. In the complex format, data reduction techniques are utilized to compress the size of all details of the route 640 or the route metadata 630. In one embodiment, segments of a curvy road that include many polylines, but few exits or intersections, may be reduced to a polyline that represents only the decision points, i.e., exits or intersections. Thus, the size of the data stored in the all details of the route 640 may be reduced significantly when storing curvy roads.

Accordingly, in some embodiments, the simple or complex format of the route database enables the routing engine to share routing information to other users that generate requests for similar routes without having to recalculate all the routing information for the route.

In some embodiments, the routing engine utilizes a graph to generate the route included in the routing information. The graph includes nodes that represent intersections and links that represent roads that connects the intersections. Each link may be associated with a rank to represent whether the road should be avoided or traveled on.

Figure 6B:
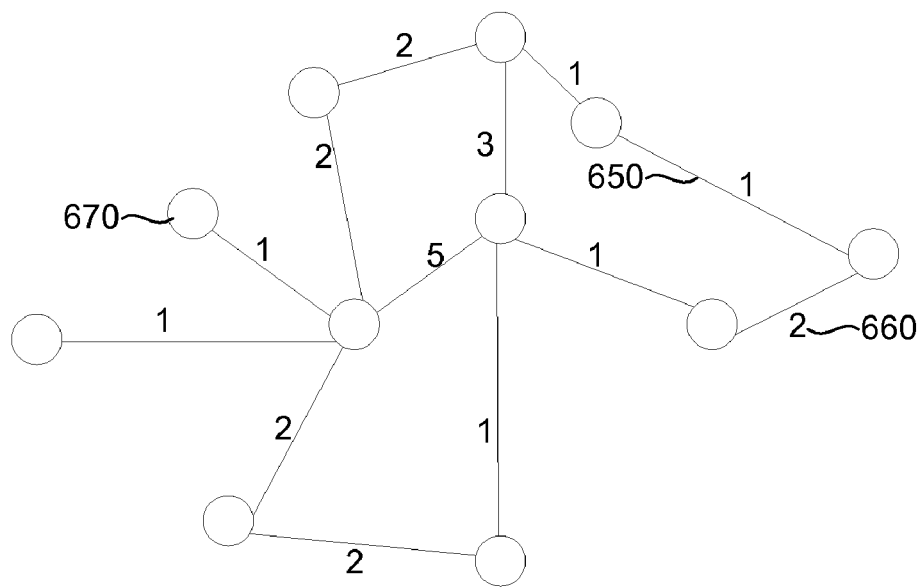
FIG. 6B is a graph that illustrates an exemplary routing network processed by the routing engine.

FIG. 6B is a graph that illustrates an exemplary routing network processed by the routing engine. The routing network includes links 650, ranks 660, and nodes 670. The links 650 connect nodes 670 in the routing network and represent the roads that connect intersections. The ranks 660 represent a number that determines whether the road should be avoided or traveled on. The nodes 670 represent intersections where two or more roads connect. The routing engine selects roads that have higher ranks 660 when generating a route. Alternatively, the routing engine may select roads with the lowest rank 660 to minimize length or time. In some embodiments, the ranks 660 of the links 650 are updated to reflect the changes included in the user modifications to the routing information received from the client devices. In the routing network, the routing engine reduces the rank 660 for roads that are removed from the route by the user modification and increases the rank 660 for roads that are added to the route by the user modification.

The routing engine is configured to deliver routing information to the client devices in response to the routing requests. The routing engine includes computer-readable media that are configured with instructions that enable the routing engine to deliver routing information that includes the route and associated metadata to the client devices. Also, the routing engine is configured to generate updated routing information in response to the user modifications received from the client devices.

Figure 7:
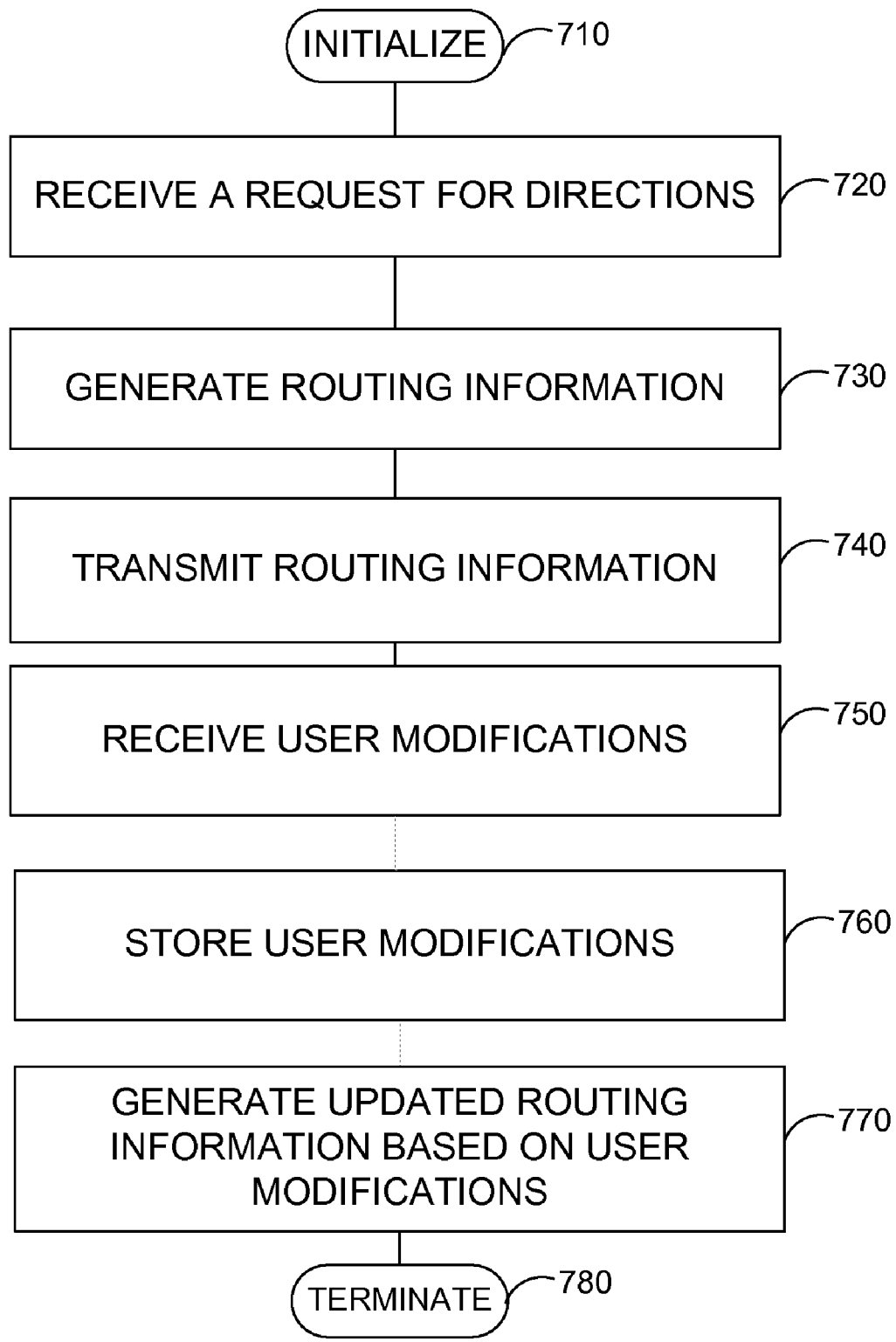
FIG. 7 is a logic diagram that illustrates an exemplary method to deliver routing information.

FIG. 7 is a logic diagram that illustrates an exemplary method to deliver routing information. The routing engine is initialized in step 710. In step 720, the routing engine receives a request for directions from a client device. In step 730, the routing engine utilizes the graph of the routing network to create system-generated routing information. In step 740, the routing engine transmits the system-generated routing information to the client device. In turn, the routing engine receives user modifications to the routing information from the client device in step 750. In step 760, the user modifications are stored in a route database associated with the routing engine. In step 770, based on the user modifications, the routing engine updates a graph that represents the routing network, processes the updated graph to generate an updated route, and generates updated metadata for the updated route. In step 780, the method terminates.

In certain embodiments, the client devices are configured to modify the routing information received from the routing engine. The client devices may generate implicit or explicit user modifications to alter the routing information received from the routing engine. Based on the user modifications, the client devices receive, from the routing engine, updated routing information that incorporates the implicit or explicit modifications.

Figure 8:
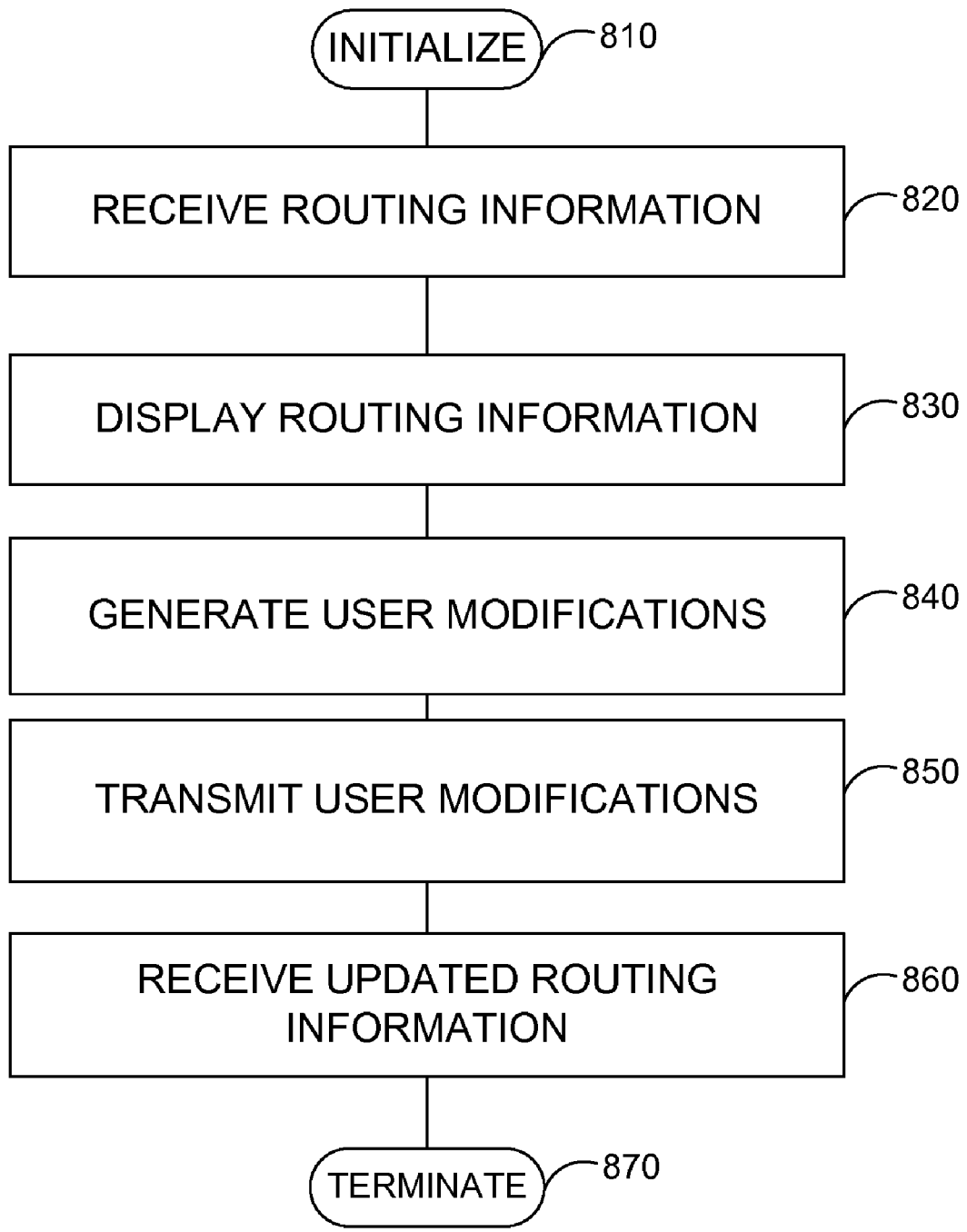
FIG. 8 is a logic diagram that illustrates an exemplary method to modify routing information.

FIG. 8 is a logic diagram that illustrates an exemplary method to modify routing information. In step 810, client device is initialized. In step 820, the client device receives the routing information from the routing engine. In step 830, the client device displays the routing information. In step 840, the client device generates implicit or explicit user modifications. In step 850, the client device transmits the implicit or explicit user modifications to the routing engine. In turn, the routing engine processes the implicit or explicit user modifications to generate updated routing information that is received by the client device from the routing engine in step 860. The method terminates in step 870.

In summary, a routing engine is configured to generate routing information in response to routing requests received from client devices. The routing engine is also configured to generate updated routing information when a client device transmits user modifications to the routing engine. The user modifications provide feedback on the system-generated routing information and are stored in a route database for use by the routing engine when responding to subsequent request for similar routes. The subsequent requests or system-generated routes are checked to determine whether a user-modified route exits for a similar route. When the system-generated route passes through the same endpoints as a stored user-modified route or when the subsequent request matches a prior request associated with user-modified routes, the routing engine may transmit routing information that includes both the user-modified route and the system-generated route to the client device. Thus, the routing engine may be configured to provide user-specific modifications as shared modifications that seamlessly incorporate knowledge provided by users of the client device.

The foregoing descriptions of the invention are illustrative, and modifications in configuration and implementation will occur to persons skilled in the art. For instance, while the present invention has generally been described with relation to FIGS. 1-8, those descriptions are exemplary. Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims. The scope of the invention is accordingly intended to be limited only by the following claims.

The invention claimed is:

1. One or more computer-readable media, not signals per se, having computer-executable instructions embodied thereon that perform a method to deliver routing information, the method comprising:
   receiving a request for directions at a routing engine;
   generating routing information in response to the request for directions received by the routing engine;
   transmitting the routing information generated by the routing engine;
   receiving user modifications to the routing information at the routing engine, wherein the routing engine conflates the user modifications to a routing network having a plurality of routes and modifies a weight associated with one or more routes based on the user modifications to make the user modifications to the routing information available to future requests for directions received by the routing engine;
   generating a notification that the user modification is incomplete when the user modification does not completely connect with the routing information generated by the routing engine;
   receiving additional information from the user that clarifies the user modification in the response to the notification, wherein the additional information includes a period of validity for the user modifications;
   generating, by the routing engine, updated routing information based on the user modifications;
   receiving, by the routing engine, a subsequent request similar to the request for directions; and
   in response to the subsequent request, providing both the routing information and the updated routing information, wherein providing both the routing information and the updated routing information further comprises: verifying that a count associated with client devices that transmit modifications similar to the user modification is above a specified threshold before providing the updated routing information that includes the user modification as a shareable modification.

2. The media of claim 1 wherein the routing information illustrates a route and provides directions from a start location to an end location on the route.

3. The media of claim 1, wherein the user modifications are generated using a route modification tool.

4. The media of claim 3, wherein the route modification tool allows the user to draw modifications on a graphical representation of the routing information.

5. The media of claim 3, wherein the route modification tool layers the user modification on a graphical representation of the routing information.

6. The media of claim 3, wherein the route modification tool provides a user with a set of modification options.

7. The media of claim 6, wherein the route modification options include a polyline.

8. A client device having a processor, and computer readable medium configured to execute a method for modifying routing information, the method comprising:
   receiving routing information in response to a request for directions;
   displaying the routing information;
   observing user modifications to the routing information;
   transmitting the user modifications to a routing engine; and receiving updated routing information based on the user modifications, wherein user modifications are observed over a specified time interval by a monitoring component that monitors coordinate information of users that request for direction, to identify deviations from the routing information for a specified route identified by the users, to count a frequency of the deviation from the specified route, to count the number of users that perform a similar deviation, and to learn the deviation when the frequency of the deviation from the specified route is above a specified threshold and the count for the number of users is above a shareable deviation threshold by including the deviation in the updated routing information.

9. A computer-implemented method to deliver routing information, the method comprising:

receiving a request for directions at a routing engine;

generating routing information in response to the request for directions received by the routing engine;

transmitting the routing information generated by the routing engine;

receiving user modifications to the routing information at the routing engine, wherein the routing engine conflates the user modifications to a routing network having a plurality of routes and modifies a weight associated with one or more routes based on the user modifications to make the user modifications to the routing information available to future requests for directions received by the routing engine;

generating a notification that the user modification is incomplete when the user modification does not completely connect with the routing information generated by the routing engine;

receiving additional information from the user that clarifies the user modification in the response to the notification, wherein the additional information includes a period of validity for the user modifications;

generating, by the routing engine, updated routing information based on the user modifications;

receiving, by the routing engine, a subsequent request similar to the request for directions; and in response to the subsequent request, providing both the routing information and the updated routing information, wherein providing both the routing information and the updated routing information further comprises: verifying that a count associated with client devices that transmit modifications similar to the user modification is above a specified threshold before providing the updated routing information that includes the user modification as a shareable modification.

10. The method of claim 9, wherein the routing information illustrates a route and provides directions from a start location to an end location on the route.

11. The method of claim 9, wherein the user modifications are generated using a route modification tool.

12. The method of claim 11, wherein the route modification tool allows the user to draw modifications on a graphical representation of the routing information.

13. The method of claim 11, wherein the route modification tool layers the user modification on a graphical representation of the routing information.

14. The method of claim 11, wherein the route modification tool provides a user with a set of modification options.

15. The method of claim 6, wherein the route modification options include a polyline.

\* \* \* \* \*